(12) United States Patent
Kim et al.

(10) Patent No.: US 6,440,028 B2
(45) Date of Patent: Aug. 27, 2002

(54) MANUAL VALVE OF HYDRAULIC PRESSURE CONTROL SYSTEM FOR AUTOMATIC TRANSMISSION

(75) Inventors: Tae-Kyun Kim; Jae-Duk Jang; Jong-Sool Park; Hyun-Soo Shim; Jin-Hee Lee; Chang-Wook Lee, all of Yongin (KR)

(73) Assignee: Hyundai Motor Company, Seoul (KR)

( * ) Notice: Subject to any disclaimer, the term of this patent is extended or adjusted under 35 U.S.C. 154(b) by 33 days.

(21) Appl. No.: 09/750,312

(22) Filed: Dec. 29, 2000

(30) Foreign Application Priority Data

Jun. 21, 2000 (KR) ........................................ 2000-34141

(51) Int. Cl.[7] ............................................... F16H 31/00
(52) U.S. Cl. ....................................... 475/131; 475/130
(58) Field of Search ................................... 475/120, 121, 475/127, 130, 131; 477/62, 168; 192/3.3, 3.29, 3.33

(56) References Cited

U.S. PATENT DOCUMENTS

| | | | | |
|---|---|---|---|---|
| 4,602,529 A | * | 7/1986 | Sugano | 477/131 |
| 5,010,786 A | * | 4/1991 | Hiramatsu et al. | 74/867 |
| 5,634,865 A | * | 6/1997 | Jang | 475/128 |
| 5,643,123 A | * | 7/1997 | Jang et al. | 475/119 |
| 5,658,220 A | * | 8/1997 | Jang | 477/130 |
| 6,206,802 B1 | * | 3/2001 | Kim | 475/127 |

* cited by examiner

Primary Examiner—Rodney H Bonck
Assistant Examiner—David D. Le
(74) Attorney, Agent, or Firm—Birch, Stewart, Kolasch & Birch, LLP

(57) ABSTRACT

A manual valve body is provided with a first port communicated with a regulator valve via a pressure line, a second port connected to a first pressure control valve and a second fail safe valve so as to supply hydraulic pressure thereto at range "P", a third port connected to the regulator valve, an N-R control valve, and first and second switch valves so as to supply the hydraulic pressure from the first port thereto at range "R", a fourth port connected to second and third pressure control valves and the first and second switch valves so as to supply the hydraulic pressure from the first valve thereto at ranges "2", "3", and "D", and a fifth port connected to the first switch valve so as to supply the hydraulic pressure from the first port thereto at range "L".

3 Claims, 3 Drawing Sheets

US 6,440,028 B2

MANUAL VALVE OF HYDRAULIC PRESSURE CONTROL SYSTEM FOR AUTOMATIC TRANSMISSION

BACKGROUND OF THE INVENTION (a) Field of the Invention

The present invention relates to a manual valve of a hydraulic pressure control system for an automatic transmission, and in particular, to an improved manual valve capable of independently controlling all friction elements of the automatic transmission using an indirect control mechanism in which second stage control pressure is provided to the friction elements and a line pressure control solenoid valve.

(b) Description of the Related Art

Generally, a conventional automatic transmission for a vehicle includes a multi-stage gear shift mechanism connected to a torque converter, and a plurality of friction elements actuated by hydraulic pressure under control of a hydraulic pressure control system for selecting a gear stage of the gear shift mechanism.

In such automatic transmissions, the hydraulic pressure control system includes a pressure control means for controlling a level of hydraulic pressure generated by a hydraulic pump, manual and automatic shift control means for performing shift operation, hydraulic pressure control means for adjusting responsibility and shift quality by smoothing shift operation, distribution means for distributing the pressure from the hydraulic pressure control means to appropriate friction elements, and damper clutch control means for controlling operation of a damper clutch of a torque converter.

The gear shift control is achieved by the friction elements being selectively and differently applied by hydraulic pressure from the distribution means and cooperation of on/off and duty control solenoid valves, such that a constitution and control method of a hydraulic control system depends on particular power trains adapted by car makers and how the power trains are controlled.

The manual valve performs pressure line conversion by driver's manipulation, and FIG. 4 shows a conventional manual valve adapted to the automatic transmission manufactured by the applicant of the present invention.

As shown In FIG. 4, a valve body is provided with a first port 200 for receiving hydraulic pressure from a hydraulic pump (not shown), a second port 202 for supplying the hydraulic pressure to a shift control valve (not shown) at ranges "D", "2", and "L", a third port 204 for supplying the hydraulic pressure to a pressure regulator valve (not shown) at ranges "N", "D", "2", and "L", and a fourth port 206 for supplying hydraulic pressure to the regulator valve and an N-R control valve (not shown) at range "R".

A valve spool 210 inserted into the valve body is provided with a connect part 212 formed at one end portion of the valve spool 210, a first land 214 positioned between the second and third ports at range "P " and positioned at the right side of the third port at other ranges, a second land 216 for communicating the third port 204 or the second and third ports 202 and 204 with the first port 200 at all ranges except for the ranges "P" and "R", and a third land 218 for communicating the first port 200 and the fourth port 206 at the range "R".

Also, the valve spool 210 is provided with a release opening 222 formed between the first and the second lands 214 and 216 and vertically passing through an axis of the valve spool 210, and a release hole 220 formed from the right end of the valve spool 210 to the release opening 222.

In this structure, the hydraulic pressure from the first port 200 is supplied to the third port 204 at range "N", to the second and third ports 202 and 204 at range "D", and to the fourth port 206 at range "R", and the hydraulic pressure from the first port 200 is released via the release opening 222 and the release hole 220 at range "P".

However, in this conventional manual valve, since the hydraulic pressure fed from the hydraulic pump is released at range "P", the regulator valve ceases control such that the torque converter can receive only a small amount of hydraulic pressure through an orifice.

Accordingly, the lack of hydraulic pressure causes the friction elements to be damaged and delays hydraulic pressure supply to the friction elements particularly under sudden acceleration, resulting in. degraded sudden acceleration performance of the vehicle. Also, it is impossible to precisely measure the oil amount at range "P."

Furthermore, this kind of manual valve can only be used in an automatic transmission because the pressure line conversions are performed at ranges of "N", "D", and "R."

SUMMARY OF THE INVENTION

The present invention has been made in an effort to solve the above problems.

It is an object of the present invention to provide a manual valve of a hydraulic pressure control system capable of hydraulic control even at the range "P", and preventing the friction elements from being damaged and avoiding sudden acceleration performance degradation because of the lack of oil.

It is another object of the present invention to provide a manual valve of the hydraulic pressure control system in which ranges can easily be modified from the 6 ranges of "P", "R", "N", "D", "2", and "L" to the 7 ranges of "P", "R", "N", "D", "3", "2", and "L".

To achieve the above object, a manual valve of a hydraulic pressure control system for an automatic transmission of the present invention comprises a valve body and a valve spool slidably inserted into the valve body, wherein the valve body is provided with a first port communicated with a regulator valve via a pressure line, a second port connected to a first pressure control valve and a second fail safe valve so as to supply hydraulic pressure thereto at range "P", a third port connected to the regulator valve, an N-R control valve, and a first and a second switch valve so as to supply the hydraulic pressure from the first port thereto at range "R", a fourth port connected to a second and a third pressure control valve and the first and second switch valves so as to supply the hydraulic pressure from the first valve thereto at ranges "2", "3", and "D", and a fifth port connected to the first switch valve so as to supply the hydraulic pressure from the first port thereto at range "L".

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
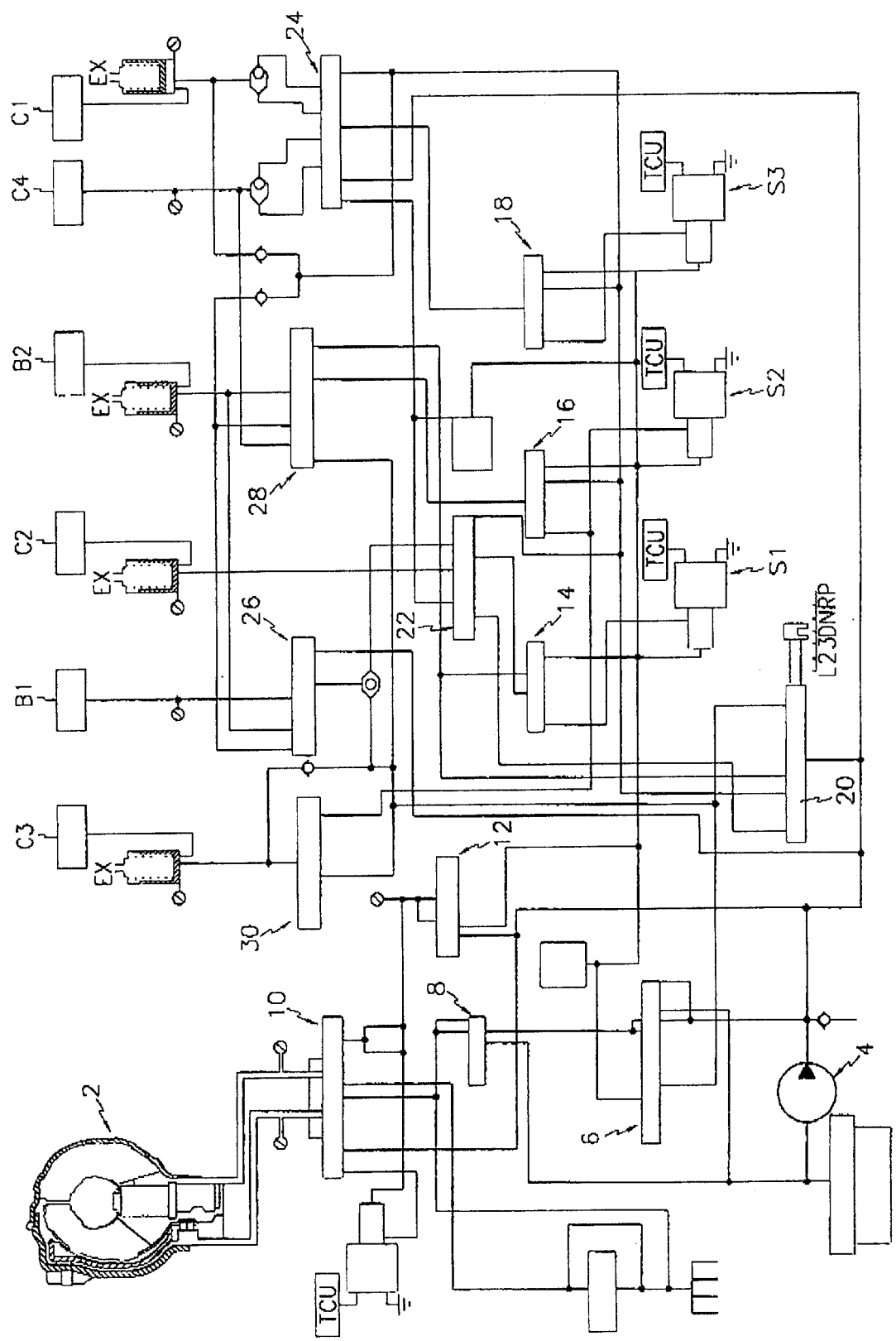
FIG. 1 is a hydraulic circuit diagram of a hydraulic pressure control system according to a preferred embodiment of the present invention.

FIG. 1 is a hydraulic circuit diagram of a hydraulic pressure control system according to a preferred embodiment of the present invention.

Once an engine runs, a torque converter 2 responsively operates such that a hydraulic pump 4 generates hydraulic pressure needed for controlling the torque converter 2, for shift control, and for lubricating the hydraulic system. The hydraulic pressure is supplied to hydraulic pressure regulating means, damper clutch control means, pressure reducing means, and to a hydraulic pressure control means for shifting gear ratios via a manual or an automatic control system. The appropriately controlled pressure is supplied to the appropriate friction elements via switching means and fail safe means, and to a pressure control part so as to be fed to the friction elements C1, C2, C3, C4, B1, and B2 via the manual and automatic shift control means and N-R control means in a reverse range.

The pressure regulating and damper clutch control means comprise a regulator valve 6 for regulating the hydraulic pressure from the hydraulic pump 4, a torque converter control valve 8 for adjusting the hydraulic pressure from the regulator valve 6 so as to be appropriate for torque converter control and as lubricant, and a damper clutch control valve 10 for controlling the damper clutch so as to enhance torque transfer efficiency of the torque converter.

The pressure reducing means comprises a reducing valve 12 for reducing the hydraulic pressure to a predetermined level so as to supply the reduced pressure partially to the damper clutch control valve 10 and partially to the regulator valve 6, as regulator valve control pressure.

Also, the reduced pressure is supplied to a pressure control means comprising first, second, and third pressure control valves 14, 16, and 18, for generating shift control pressure and first, second, and third solenoid valves for controlling the first, second, and third pressure control valves.

The manual and automatic shift control means comprises a manual valve 20 which is responsively operated by a driver's shift lever manipulation so as to appropriately convert pressure feeding lines. The hydraulic pressure supplied to the manual valve 20 is supplied to the pressure control means according to the shift range or directly supplied to the corresponding friction elements via first and second switch valves 22 and 24 of the switching means, first and second fail safe valves of the fail safe means, and an N-R control valve 30 of the N-R control means.

Figure 2:
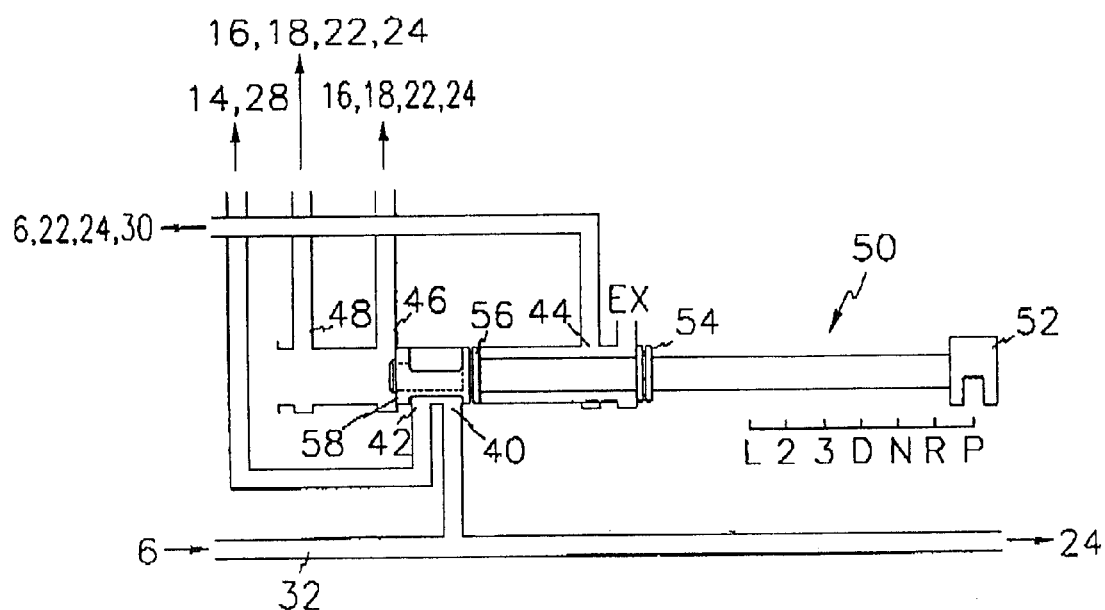
FIG. 2 is an enlarged view showing a manual valve adapted to the hydraulic control system of FIG. 1.
Figure 3:
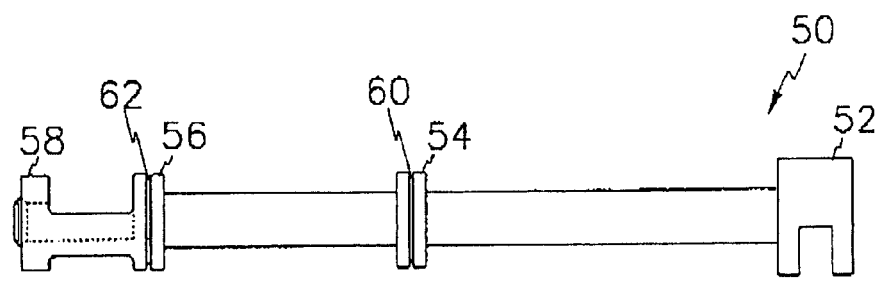
FIG. 3 shows a valve spool of the manual valve of FIG. 2.
Figure 4:
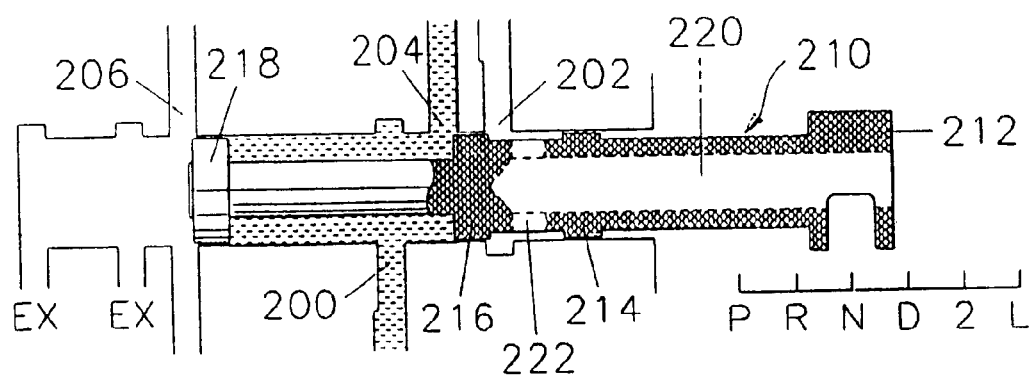
FIG. 4 is a sectional view for illustrating a structure of a conventional manual valve.

In this hydraulic pressure control system, as shown in FIG. 2, the manual valve 20 comprises a valve body and a valve spool.

The valve body comprises a first port 40 communicated with a pressure line 32 of the regulator valve 6, a second port 42 connected to a first pressure control valve 14 and a second fail safe valve 28 so as to supply the hydraulic pressure from the first port 40 thereto at range "P", a third port 44 connected to the regulator valve 6, the N-R control valve 30, and the first and second switch valves 22 and 24 connected so as to supply the hydraulic pressure from the first port 40 thereto at range "R", a fourth port 46 connected to the second and third pressure control valves 16 and 18 and the first and second switch valves 22 and 24 so as to supply the hydraulic pressure from the first valve 40 thereto at ranges "2", "3", and "D", a fifth port 48 connected to the first switch valve 22 so as to supply the hydraulic pressure from the first port 40 thereto at range "L", and a release port "Ex" formed near the third port 44 so as to release the hydraulic pressure at range "P."

The valve spool 50 comprises a connect member 52 formed at one end portion of the valve spool 50, a first land 54 formed near the connect member 52 for communicating the first port 40 and the third port 44 at range "P"; a second land 56 formed so as to be positioned between the first and the third ports 40 and 44 at range "P", positioned between the first and the second ports 40 and 42 at range "R", positioned between the second and the fourth ports 42 and 46 at range "N", positioned between the fourth and the fifth ports 46 and 48 at ranges "D", "3", and "2", and positioned at the outer side of the fifth port 48 at range "L", and a third land 58 formed at the other end portion of the valve spool 50 so as to be positioned between the second and fourth ports 42 and 46 at range "P", positioned between the fourth and fifth ports 46 and 48 at ranges "R", "N", and "D", and positioned at the outer side of the fifth port 48 at ranges "3", "2", and "L".

The first and second lands 54 and 56 are provided with respective grooves 60 and 62 around their circumferential outer surfaces so as to reduce a sticky feeling caused when the valve spool 50 reciprocates in the valve body.

That is, the grooves 60 and 62 of the first and second lands 54 and 56 quickly and evenly spread oil circumferentially when the pressure is unevenly applied by a lopsided load, so as to avoid the sticky feeling.

In the above structured manual valve according to the present invention, the first port 40 communicates with the second port 42 at ranges "P" and "N" so as to supply the hydraulic pressure to the first pressure control valve 14 and the second fail safe valve 28; the first port 40 communicates with the third port 44 at range "R" so as to supply the hydraulic pressure to the regulator valve 6, the N-R control valve 30, and the first and second valves 26 and 28; the first port 40 communicates with the second and fourth ports 42 and 46 so as to supply the hydraulic pressure to the second and third pressure control valves 16 and 18 and the first and second switch valves 22 and 24 at ranges "D", "3", and "2"; the first port 40 communicates with the second, fourth, and fifth ports 42, 46, and 48 so as to supply the hydraulic pressure to the first, second, and third pressure control valves 14, 16, and 18, the first and second switch valves 22 and 24, the first and second fail safe valves 26 and 28, and the N-R control valve 30 at the range "L."

The pressure control part controls the valves such that the hydraulic pressure can be supplied to the appropriate friction elements corresponding to the shift ranges.

In this embodiment of the present invention, even though only a manual valve of 7 ranges is explained, the present invention can be easily adapted to a manual valve of 6 ranges by molding the valve body while modifying the position of the fifth port, which avoids redesigning of the manual valve.

As described above, in the manual valve of the present invention, the hydraulic pressure is supplied to the hydraulic pressure control system even at the ranges "P" and "N" so as to make it possible to control the line pressure, to prevent the friction elements from being damaged, and to prevent the sudden acceleration performance from deteriorating. Also, it is possible to measure the amount of oil at range "P."

Furthermore, according to the present invention, it is possible to easily modify the range indications from the 6 ranges of "P", "R", "N", "D", "2", and "L" to 7 ranges of "P", "R", "N", "D", "3", "2", and "L", and vice versa, resulting in a reduction in total manufacturing costs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A manual valve of a hydraulic pressure control system for an automatic transmission, comprising:

a valve body which is provided with a first port communicated with a regulator valve via a pressure line, a second port connected to a first pressure control valve and a second fail safe valve so as to supply hydraulic pressure thereto at range "P", a third port connected to the regulator valve, an N-R control valve, and first and second switch valves so as to supply the hydraulic pressure from the first port thereto at range "R", a fourth port connected to second and third pressure control valves and the first and second switch valves so as to supply the hydraulic pressure from the first valve thereto at ranges "2", "3", and "D", a fifth port connected to the first switch valve so as to supply the hydraulic pressure from the first port thereto at range "L"; and a valve spool slidably inserted into the valve body so as to selectively communicate the first port to at least one other port.

2. A manual valve of claim 1 wherein the valve spool comprises a connect member formed at one end portion of the valve spool, a first land formed near the connect member for communicating the first port 40 to the third port at range "P"; a second land formed so as to be positioned between the first and third ports at range "P", positioned between the first and second ports at range "R", positioned between the second and fourth ports at range "N", positioned between the fourth and fifth ports at ranges "D", "3", and "2", and positioned at an outer side of the fifth port at range "L"; and a third land formed at the other end portion of the valve spool so as to be positioned between the second and fourth ports at range "P", positioned between the fourth and fifth ports at ranges "R", "N", and "D", and positioned at the outer side of the fifth port at ranges "3", "2", and "L."

3. A manual valve of claim 1 wherein the first and the second lands are each provided with a groove formed around a circumferential surface thereof.

* * * * *